US006931436B2

(12) United States Patent
Lawrence et al.

(10) Patent No.: US 6,931,436 B2
(45) Date of Patent: Aug. 16, 2005

(54) METHODS AND SYSTEMS FOR ASYNCHRONOUS CATALOG REQUESTS FOR SYSTEM OBJECTS VIA SECURE TABLE LOOK-UP

(75) Inventors: Nicholas Todd Lawrence, Rochester, MN (US); Randy Keith Rolfe, Rochester, MN (US); Jason John Spieth, Rochester, MN (US); Kathryn Rose Steinbrink, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 09/848,443

(22) Filed: May 3, 2001

(65) Prior Publication Data

US 2002/0165935 A1 Nov. 7, 2002

(51) Int. Cl.[7] .............................................. G06F 15/16
(52) U.S. Cl. ........................ 709/217; 709/245; 709/248
(58) Field of Search ................................. 709/217–219, 709/225, 227, 213, 203; 707/9–10, 3

(56) References Cited

U.S. PATENT DOCUMENTS

| 5,689,697 | A | | 11/1997 | Edwards et al. ............. 395/603 |
| 6,430,562 | B1 | * | 8/2002 | Kardos et al. ................ 707/10 |
| 6,505,200 | B1 | * | 1/2003 | Ims et al. ...................... 707/8 |
| 6,535,908 | B1 | * | 3/2003 | Johnson et al. .......... 707/104.1 |

* cited by examiner

Primary Examiner—Patrice Winder
Assistant Examiner—Jeffrey R. Swearingen
(74) Attorney, Agent, or Firm—Moser, Patterson & Sheridan, LLP

(57) ABSTRACT

Systems and methods are provided for handling synchronous requests from a requesting entity. Illustratively, the requesting entity is in a database management system and the requests are made to a catalog server. The catalog server is configured to respond to the requests by accessing a catalog database. An interface is provided between an application and a catalog server. The interface is configured to determine whether the catalog server is available to handle requests. If the catalog server is unavailable and if the request is a synchronous request, the interface determines whether the request may be processed asynchronously.

30 Claims, 3 Drawing Sheets

METHODS AND SYSTEMS FOR ASYNCHRONOUS CATALOG REQUESTS FOR SYSTEM OBJECTS VIA SECURE TABLE LOOK-UP

BACKGROUND OF THE INVENTION

1. Field of the Invention

The present invention generally relates to data processing systems. More particularly, embodiments of the present invention related to handling requests made to a database.

2. Description of the Related Art

Databases are computerized information storage and retrieval systems. A relational database management system is a computer database management system (DBMS) that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Reference is made to C. J. Date, *An Introduction to Database Systems*, 6th edition, Addison-Wesley Publishing Co. Reading. Mass. (1994) for a comprehensive general treatment of the relational database art.

An DBMS is structured to accept commands to store, retrieve and delete data using high-level query languages such as the Structured Query Language (SQL). The term "query" denominates a set of commands for retrieving data from a stored database. The SQL standard has been promulgated by the International Standards Association since 1986.

In a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. A catalog lookup and add request occurs, for example, when a requesting entity requests to add triggers or constraints to a file.

When triggers or constraints are added to a file at the request of a requesting entity, a synchronous communication process takes place between the requesting entity and a catalog manager. The catalog manager is responsible for determining whether the requested name is available by accessing one or more of a plurality of catalogs. This step is necessary because both triggers and constraints (and, more generally, any named element) must have names that are unique with the system.

FIG. 1 shows a processing system 100 illustrating a synchronous communication process. The processing system 100 includes a requesting entity 102, a catalog server 104 and a catalog database 106. An interface 108 is disposed between the requesting entity 102 and the catalog server 104. A communication process is initiated when the requesting entity 102 issues a request for a name (e.g., a trigger name, a constraint name, etc.) to the catalog server 104. The interface 108 formats the request and forwards the request to the catalog server 104. The catalog server 104 then determines whether the request can be satisfied (e.g., whether the name being requested by the application is available) by accessing the catalog database 106. A response is then returned from the catalog server 104 to the requesting entity 102.

For a synchronous request, the requesting entity 102 supplies the address of a response queue in the request to the catalog server 104. After making the request, the requesting entity 102 waits for a response in the response queue. During this time, the requesting entity 102 is unavailable to handle other processing. Once the requesting entity 102 receives a response from the catalog server 104, the requesting entity 102 is free to resume processing.

A problem occurs when the catalog server 104 is unavailable to handle requests from the requesting entity 102. The situation may occur, for example, when the system 100 is installing new operating system code or during an initial program load (IPL) when the system 100 is making a transition from a powered down state to a usable state. In this case, the requesting entity 102 has no means to determine whether a name is available for a requested element (e.g., a trigger or a constraint). In addition, because the request is synchronous, the requesting entity 102 is unavailable for processing while waiting for a response from the catalog server 104. Accordingly, the ability of the system 100 to operate efficiently and effectively is compromised.

Therefore, there is a need for a system and a method for handling catalog requests when a catalog server is unavailable.

SUMMARY OF THE INVENTION

Systems, methods and articles of manufacture are provided for handling requests from a requesting entity. The requests may be synchronous or asynchronous. Illustratively, the requests are made to a catalog server in a database management. The catalog server is configured to respond to the requests by accessing a catalog database.

In one embodiment, a method of determining whether synchronous requests may be handled asynchronously is provided. The method comprises receiving a request for a unique identifier from a requesting entity and determining whether the catalog server in a database management system is available to handle the request. If the catalog server is not available, the method comprises determining whether the request may be handled asynchronously in the event that the request is synchronous. If the request may be handled asynchronously, the request is provided to catalog server for processing and returning control to the requesting entity.

Another method of determining whether synchronous requests may be handled asynchronously comprises receiving a request for a unique identifier from a requesting entity; determining whether a catalog server in a database management system is available to handle the request; if the catalog server is not available, determining whether the request is synchronous; and if the request is synchronous, determining whether the request may be handled asynchronously. Determining whether the request may be handled asynchronously comprises determining (i) whether the request is for a restricted unique identifier and (ii) whether the requesting entity has authority to use the restricted unique identifier. If the request may be handled asynchronously, the method further comprises providing the request to the catalog server and returning control to the requesting entity.

Yet another embodiment provides a signal bearing medium containing a program which, when executed by a processor, performs a method of determining whether synchronous requests may be handled asynchronously. The method comprises receiving a request for a unique identifier from a requesting entity and determining whether a catalog server in a database management system is available to handle the request. If the catalog server is not available, the method comprises determining whether the request is synchronous. If the request is synchronous, a determination is made as to whether the request may be handled asynchronously. Determining whether the request may be handled asynchronously comprises determining (i) whether the request is for a restricted unique identifier and (ii) whether the requesting entity has authority to use the restricted unique identifier. If the request may be handled asynchronously, the method further comprises providing the request to the catalog server and returning control to the requesting entity.

Still another embodiment, provides a system, comprising a database; a server configured to process requests submitted by requesting entities by accessing the database; a restricted names table containing restricted unique identifiers; and requesting entities configured to submit requests for unique identifiers for database elements. At least one first requesting entity is configured to submit requests for unique identifiers for database elements and is authorized to access the restricted names table. At least one second requesting entity is configured to submit requests for unique identifiers for database elements and is unauthorized to access the restricted names table. A transaction interface is configured to (i) determine whether the server is available for processing requests and, (ii) if the server is not available, determine whether a synchronous request may be handled asynchronously.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide methods and systems for handling catalog requests when a catalog server is unavailable. In general, an interface program is provided between an application and a catalog server. The interface is configured to determine whether the catalog server is available to handle requests. If the catalog server is unavailable and if the request is a synchronous request, the interface determines whether the request may be processed asynchronously. In a particular embodiment, reference is made to a system names table to determine the availability of a requested name. If the requested name can be located, the request is processed asynchronously so that control is returned to the requesting application One embodiment of the invention is implemented as a program product for use with a computer system such as, for example, the processing system 200 and described below. The program(s) of the program product defines functions of the embodiments (including the methods described below with reference to FIG. 3) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
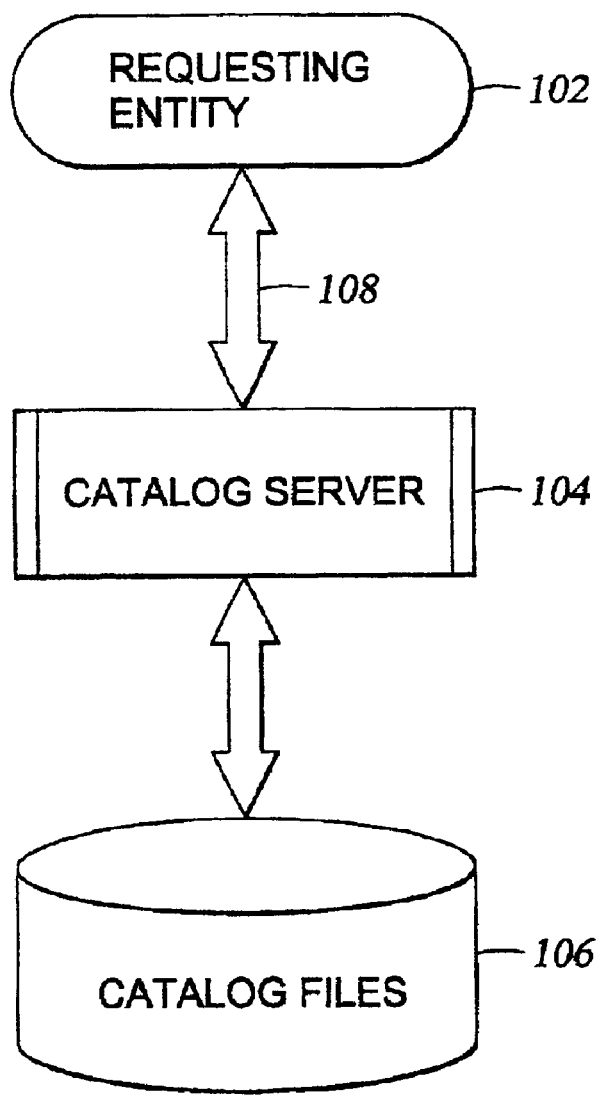
FIG. 1 is a high level diagram of a prior art processing system illustrating a relationship between a catalog server and an application.
Figure 2:
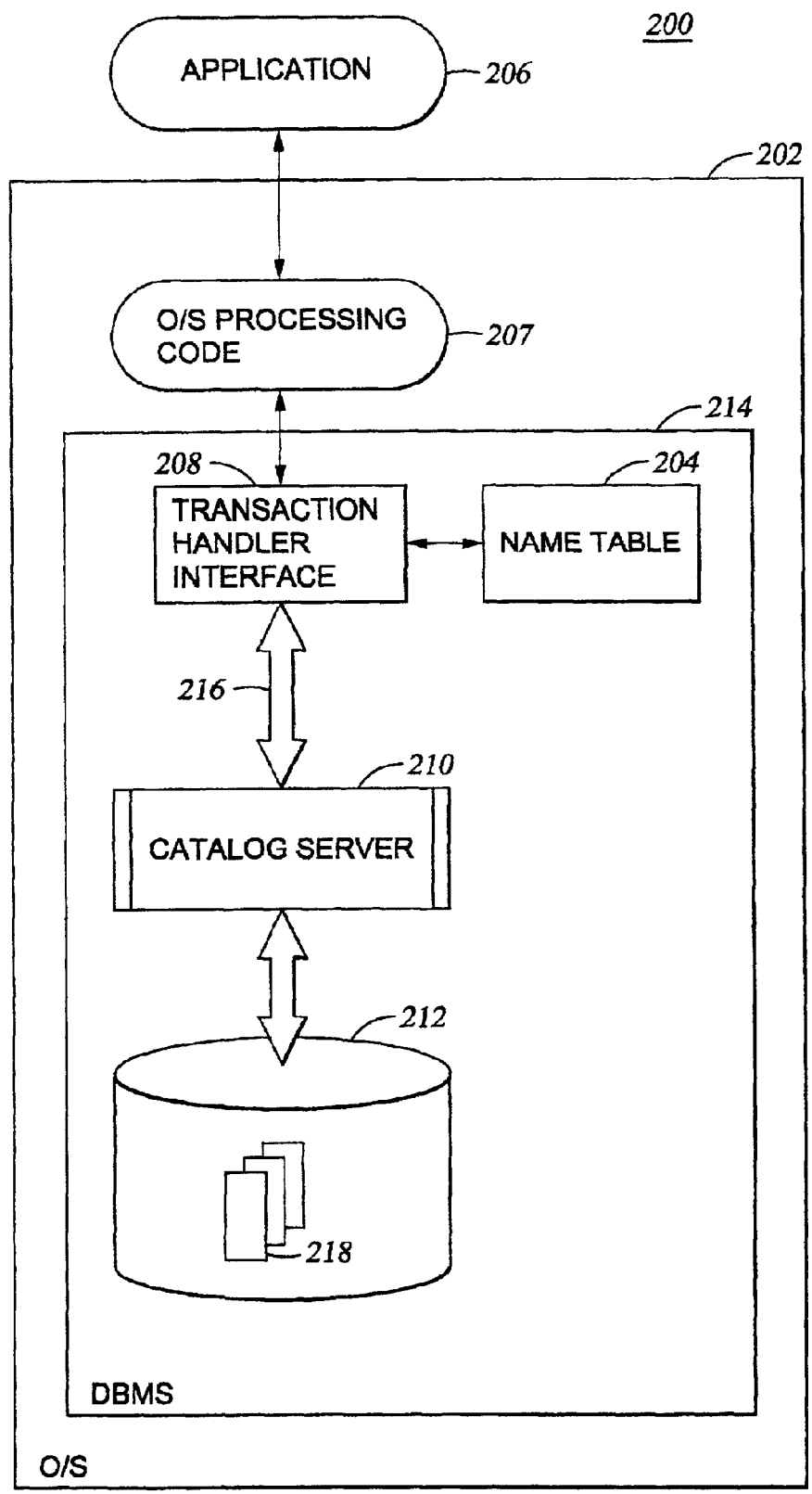
FIG. 2 is a diagram of a processing system illustrating a relationship between a catalog server and a number of requesting entities.

FIG. 2 shows a processing system 200. Illustratively, the processing system 200 is the iSeries® computer system available from International Business Machines®. The processing system 200 is generally under the control of an operating system 202. The processing system 200 further includes an application 206 configured for some predetermined processing which includes making requests to a database management system 214. Although only one application 206 is shown, the processing system 200 may include any number of applications each of which is capable of making requests to the database management system 214.

Illustratively, the database management system 214 includes a catalog server 210 and a catalog database 212. In the embodiment shown, the database management system 214 is part of the operating system 202. However, in other embodiments the database management system 214 and the operating system 202 are separate. The catalog server 210 responds to requests from the application 206 and the operating system 210 by accessing a catalog database 212. The catalog database 212 maintains a set of tables 218 containing information about the data in the database management system 214. Collectively the tables 218 are referred to as a catalog. The tables 218 may contain information about tables, parameters, procedures, packages, views, indexes, constraints and triggers on the system 200.

In general, the catalog server 210 maintains the physical tables 218 and the data within them. Updates to the catalog database 212 are the result of SQL statements and system commands that create, modify or destroy elements of the On database. As used in this context, "elements" is defined as objects and their respective attributes. Illustrative elements include tables, views, triggers, procedures, user-defined functions (UDF), constraints, columns and the like. Each of the SQL statements and system commands have associated processing code in the operating system 202. When the statements and commands are executed, the catalog server 210 is notified and requested to update tables 218 contained in the catalog database 212.

In operation, the tables 218 may be used by applications (e.g., application 206) and human operators as a general reference to all the elements within the database management system 214. In addition, the tables 218 are used internally by the operating system 202 in order to maintain uniqueness of names (e.g., filenames, field names, trigger names, constraint names, etc.), enforce rules (e.g., enforcing parameter validity) and provide a cross-reference of elements for use in ensuring integrity of the database.

A transaction handler 208 is provided as an interface between the application 206 and a catalog server 210 and between the catalog server and components of the operating system 202. Illustratively, the transaction handler 208 is a component of the operating system 202. However, in other embodiments the transaction handler 208 is separate from the operating system 202. In general, the transaction handler 208 is an interface configured to determine whether the catalog server 210 is available in response to receiving a request from the application 206 and/or operating system 210. The request may be for a unique identifier for one of a plurality of system elements including files, constraints and triggers. If the catalog server 210 is not available, the transaction handler 208 may take steps to service the request. In particular, the transaction handler 208 refers to a name table 204 to determine whether the name for a system object is available.

Illustratively, a name table 204 is a component of the operating system 202. The name table 204 contains a list of restricted names and the libraries where those names are expected to be used. In particular, the contents of the name table 204 are for the exclusive use of some requesting entity. As such, the contents of the name table 204 cannot be altered or modified by an unauthorized user/application on the system 200. Illustratively, the authorized requesting entity is one of the operating system 202 and the database management system 214. In one embodiment, the form of the names contained in the name table 204 are strings of characters not normally used by the application 206 in order to reduce the possibility of name collisions with an application.

In a particular embodiment, the processing system 200 is configured for message queuing to allow for information exchange between the O/S processing code 207 and a catalog server 210. Accordingly, FIG. 2 includes a queuing mechanism 216 between the catalog server 210 and the transaction handler 208. The queuing mechanism 216 may include various components known in the art including one or more reply/response queues, a queue manager and the appropriate interfaces. However, the particular information transport mechanism between the catalog server 210 and the transaction handler 208 is not limiting of the present embodiments.

Each of the application 206, operating system 202 (e.g., the operating system processing code 207) and the transaction handler interface 208 (or components thereof) may be considered a "requesting entity". More particularly, requests originate with one of the application 206 or the operating system 202. The requests may then be provided to the transaction handler interface 208 which, in turn, is configured to submit a request to the catalog server 210. The transaction handler interface 208 is configured to determine the availability of the catalog server 210. Depending on the source of the original request received by the transaction handler interface 208 and the availability of the catalog server 210, the request is either rejected or provided to the catalog server 210 for processing. If the request is processed, it is then processed either synchronously or asynchronously, depending on the conditions.

Figure 3:
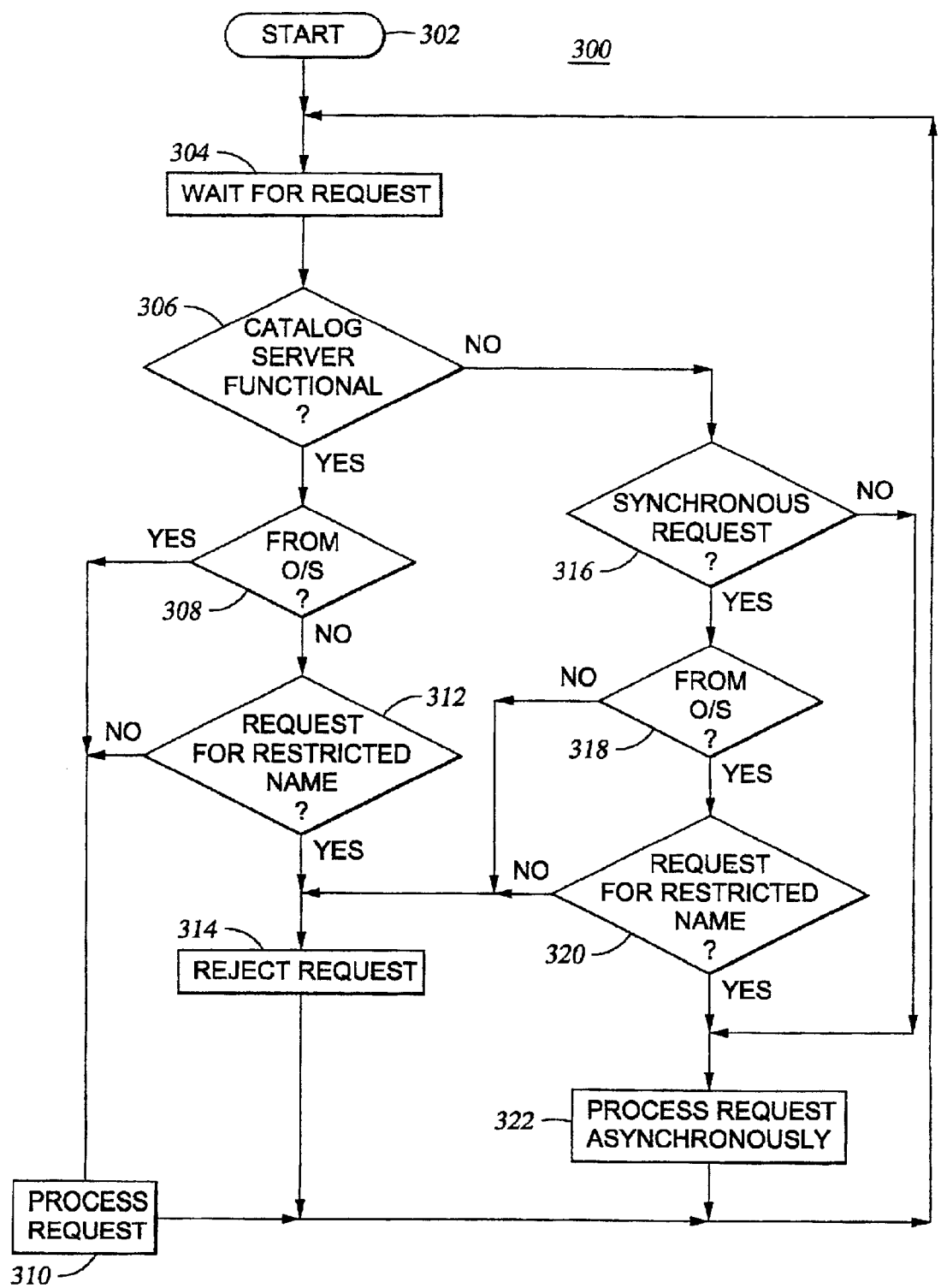
FIG. 3 is a flow chart illustrating a method handling synchronous requests made to a database.

FIG. 3 is a method 300 illustrating how requests directed to the catalog server 210 may be handled. In one embodiment, the method 300 represents the operation of the transaction handler 208. The sequence of method 300 is merely illustrative and some steps may be arranged in a different order. Thus, persons skilled in the art will appreciate other embodiments contemplated by the present inventors.

The method 300 is entered at step 302 and proceeds to step 304 where the method 300 waits for a request. The request is either an asynchronous request or a synchronous request. In particular, the request may be for a unique name/identifier for a database element.

Once a request is received, the method 300 proceeds to step 306. At step 306, the method 300 queries whether the catalog server 210 is functional. That is, a determination is made as to whether the catalog server 210 is available to process the request. If the catalog server 210 is available, the method 300 queries at step 308 whether the request is from an authorized requesting entity having authority to use the names contained in the names table 204. In the illustrative embodiment, the authorized requesting entity is the operating system 202. Thus, step 308 determines whether the request is from the operating system 202. In one embodiment, this determination is made according to whether the operating system 202 is being initiated, i.e., loaded. This may occur, for example, when the system 200 is being powered up. During this time, the operating system 202 makes requests that must be responded to in order to fully implement the operating system 202. Further, during this time, the system 200 is not yet configured to allow for requests from the application 206. Thus, any requests received while the operating system 202 is being initiated, necessarily originate from the operating system 202. Accordingly, if step 308 is answered affirmatively, the method 300 proceeds to step 310 where the request is processed. The method 300 then returns to step 304 to wait for another request.

A negative determination at step 308 presumably indicates that the request is being made by an application 206. In this case, the method 300 proceeds from step 308 to step 312 and queries whether the request is for a restricted name. The determination at step 312 is made by referencing the name table 204. If the requested name is not found in the name table 204, step 312 is answered negatively and the method 300 proceeds to step 310 where the request is processed. The request processed at step 310 may be synchronous or asynchronous. If the requested name is found in the name table 204, step 312 is answered affirmatively and the request is rejected at step 314, thereby preserving the uniqueness of the requested name. The method 300 then returns to step 304 to wait for another request.

Returning to step 306, if the catalog server 210 is not functional, the method 300 proceeds to step 316. At step 316, the method 300 queries whether the request is a synchronous request. A synchronous request is any request which requires the operation of the requesting entity to be suspended until a response is received. Conversely, an asynchronous request allows the requesting entity to proceed before the request is processed. If the request is asynchronous (i.e., step 316 is answered negatively), then the request is processed at step 322 and the method 300 returns to wait for another request at step 304. If the request is synchronous (i.e., step 316 is answered affirmatively), then the method 300 proceeds to step 318 and queries whether the operating system 202 is being initiated. A negative response to step 318 indicates a possible system error. Thus, if the operating system 202 is not being initiated at step 318, the request is rejected at step 314.

Otherwise, the method 300 proceeds to step 320 and queries whether the request is for a restricted name. As described with reference to step 312, this determination can be made with reference to the name table 204. If step 320 is answered negatively, the method 300 rejects the request at step 314. If step 320 is answered affirmatively, the method 300 proceeds to step 322 where the request is processed asynchronously. In this case, the requesting entity (e.g., the operating system 202) receives a response allowing the requesting entity to proceed with further processing before the response is processed by the catalog server 210. When the catalog server 210 resumes operation, the request is processed. In either case, whether the request is rejected at step 314 or processed at step 322, the method 300 returns to step 304 to wait for another request.

The foregoing embodiments are directed to ensuring the successful implementation of an operating system. In a particular embodiment, this is accomplished by the provision of a data structure which is exclusively controlled by the operating system. More generally, however, embodiments of the present invention are applicable during any initial program load in which a requesting entity makes a synchronous request for a unique identifier. Where the conditions under which such a request is made are known, a determination can be made as to whether the requesting entity is authorized to make the request. Accordingly, steps 308 and 318 may genetically be understood as a determination of whether a requesting entity is making a request during initiation of the requesting entity. If so, and if the request is for a restricted name located in a data structure which the requesting entity is authorized to access, then the request can be processed asynchronously.

While the foregoing is directed to embodiments of the present invention, other and further embodiments of the invention may be devised without departing from the basic scope thereof, and the scope thereof is determined by the claims that follow.

What is claimed is:

1. A method of processing a requested synchronous operation during an initial program load or during a system install, comprising:
   receiving, from a requesting entity, a request for the synchronous operation to create an object that requires an identifier that is unique within a namespace identified by a catalog server;
   determining whether the catalog server in a database management system is available to handle the request;
   if the catalog server is unavailable, determining whether the request may be handled asynchronously by determining whether the unique identifier conflicts with a name in a name table; and
   if the request may be handled asynchronously, allowing the requested synchronous operation to be processed asynchronously and returning control to the requesting entity.

2. The method of claim 1, wherein determining whether the request may be handled asynchronously comprises accessing a data structure containing restricted names for system elements.

3. The method of claim 1, wherein the request is for a unique identifier and wherein determining whether the request may be handled asynchronously comprises determining whether a data structure contains the unique identifier, wherein the data structure contains restricted unique identifiers for system objects.

4. The method of claim 1, wherein determining whether the request may be handled asynchronously comprises accessing a data structure containing restricted names for system objects comprising at least one of triggers and constraints.

5. The method of claim 1, wherein determining whether the request may be handled asynchronously comprises determining whether the requesting entity is an operating system.

6. The method of claim 1, wherein determining whether the request may be handled asynchronously comprises determining whether one of an operating system and the database management system is being loaded.

7. The method of claim 1, wherein determining whether the request may be handled asynchronously comprises accessing a name table containing a plurality of unique identifiers.

8. The method of claim 1, wherein determining whether the synchronous request may be handled asynchronously comprises accessing a name table containing a plurality of unique identifiers reserved for use by an operating system.

9. The method of claim 1, wherein determining whether the request may be handled asynchronously comprises:
   determining whether a program is being loaded, wherein the program is one of an operating system and the database management system; and
   if the program is being loaded, determining whether the request is for a restricted unique identifier usable only by the program.

10. The method of claim 9, wherein determining whether the request is for the restricted unique identifier usable only by the program comprises determining whether a data structure contains the restricted unique identifier, wherein the data structure contains a plurality of restricted unique identifiers for system elements.

11. A method, comprising:
   receiving, from a requesting entity, a request for a unique identifier;
   determining whether a catalog server in a database management system is available to handle the request;
   if the catalog server is not available, determining whether the request is synchronous, wherein a synchronous request blocks the requesting entity from activity until the request is completed by the catalog server;
   if the request is synchronous, determining whether the request may be handled asynchronously by determining (i) whether the request is for a restricted unique identifier and (ii) whether the requesting entity has authority to use the restricted unique identifier; and
   if so, providing the request to a transaction handler interface configured to process the request in an asynchronous manner and returning control to the requesting entity.

12. The method of claim 11, wherein determining whether the request may be handled asynchronously comprises determining whether the requesting entity one of the database management system and an operating system.

13. The method of claim 11, wherein determining whether the request may be handled asynchronously comprises determining whether one of the database management system and an operating system is being loaded.

14. The method of claim 11, wherein determining whether the request may be handled asynchronously comprises determining whether the requesting entity is a component of a program being loaded.

15. The method of claim 11, wherein determining whether the request may be handled asynchronously is performed by an interface.

16. The method of claim 11, wherein determining whether the request may be handled asynchronously comprises:
   determining whether a program is being loaded, wherein the program is one of an operating system and the database management system; and
   if the program is being loaded, determining whether the request is for a restricted unique identifier usable only by the program.

17. The method of claim 11, wherein determining whether the request may be handled asynchronously comprises accessing a data structure containing a plurality of restricted unique identifiers for system elements.

18. The method of claim 17, wherein the system elements comprise at least one of triggers and constraints.

19. A computer-readable medium containing a program which, when executed by a processor, performs a method, comprising;
   receiving, from a requesting entity, a request for a unique identifier;
   determining whether a catalog server in a database management system is available to handle the request;
   if the catalog server is not available, determining whether the request is synchronous, wherein a synchronous request blocks the requesting entity from activity until the request is completed by the catalog server;
   if the request is synchronous, determining whether the request may be handled asynchronously by determining (i) whether the request is for a restricted unique identifier and (ii) whether the requesting entity has authority to use the restricted unique identifier; and
   if so, providing the request to a transaction handler configured to process the request in an asynchronous manner and returning control to the requesting entity.

20. The computer-readable medium of claim 19, wherein determining whether the request may be handled asynchronously comprises determining whether the requesting entity one of the database management system and an operating system.

21. The computer-readable medium of claim 19, wherein determining whether the request may be handled asynchronously comprises determining whether one of the database management system and an operating system is being loaded.

22. The computer-readable medium of claim 19, wherein determining whether the request may be handled asynchronously comprises determining whether the requesting entity is a component of a program being loaded.

23. The computer-readable medium of claim 19, wherein determining whether the request may be handled asynchronously is performed by an interface.

24. The computer-readable medium of claim 19, wherein determining whether the request may be handled asynchronously comprises:
   determining whether a program is being loaded, wherein the program is one of an operating system and the database management system; and
   if the program is being loaded, determining whether the request is for a restricted unique identifier usable only by the program.

25. The computer-readable medium of claim 19, wherein determining whether the request may be handled asynchronously comprises accessing a data structure containing a plurality of restricted unique identifiers for system elements.

26. The computer-readable medium of claim 25, wherein the system elements comprise at least one of triggers and constraints.

27. A system, comprising:
   a database;
   a server configured to process requests submitted by requesting entities by accessing the database;
   a restricted names table containing restricted unique identifiers;
   at least one first requesting entity configured to submit requests for a unique identifier for a database element and wherein the first requesting entity is authorized to access the restricted names table;
   at least one second requesting entity configured to submit requests for the unique identifier for the database element and wherein the second requesting entity is unauthorized to access the restricted names table; and
   a transaction interface configured to (i) determine whether the server is available for processing requests and, (ii) if the server is not available, determine whether a synchronous request may be handled asynchronously by determining whether a request for the unique identifier from one of the second requesting entities conflicts with a name in the restricted names table.

28. The system of claim 27, wherein the transaction interface is configured to determine whether the synchronous request may be handled asynchronously by determining whether the synchronous request is from the first requesting entity and determining whether the request is for a restricted unique identifier contained in the restricted names table.

29. The system of claim 27, wherein the transaction interface is configured to determine whether the synchronous request may be handled asynchronously by determining whether the synchronous request is from the first requesting entity.

30. The system of claim 29, wherein the transaction interface is configured to determine whether the synchronous request is from the first requesting entity by determining whether the first requesting entity is a component of a program being loaded.

* * * * *